US012015209B2

(12) United States Patent
Barabash

(10) Patent No.: US 12,015,209 B2
(45) Date of Patent: Jun. 18, 2024

(54) BEAM STEERING RESOLUTIONS ENHANCEMENT

(71) Applicant: NOKIA TECHNOLOGIES OY, Espoo (FI)

(72) Inventor: Darrell Barabash, Grapevine, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 432 days.

(21) Appl. No.: 17/290,538

(22) PCT Filed: Nov. 12, 2018

(86) PCT No.: PCT/US2018/060569
§ 371 (c)(1),
(2) Date: Apr. 30, 2021

(87) PCT Pub. No.: WO2020/101640
PCT Pub. Date: May 22, 2020

(65) Prior Publication Data
US 2022/0013904 A1 Jan. 13, 2022

(51) Int. Cl.
*H03C 7/02* (2006.01)
*H01Q 3/36* (2006.01)
(Continued)

(52) U.S. Cl.
CPC ............ *H01Q 3/36* (2013.01); *H04B 7/0617* (2013.01)

(58) Field of Classification Search
CPC ... H01Q 3/36; H01Q 3/08; H01Q 3/34; H04B 7/0617; H04B 7/06; H04B 7/0408; H04B 7/08; G01S 3/74
See application file for complete search history.

(56) References Cited

U.S. PATENT DOCUMENTS 4,675,682 A * 6/1987 Adam ................... H01Q 3/36
333/147
6,351,240 B1 2/2002 Karimullah et al.
(Continued)

FOREIGN PATENT DOCUMENTS

CN 102656817 A 9/2012
CN 104919716 A 9/2015
(Continued)

OTHER PUBLICATIONS

1 J. Du, et al., "Matching in the Air: Optimal Analog Beamforming under Angular Spread", Oct. 2019, 10 pages.
(Continued)

*Primary Examiner* — Stephen M D Agosta
(74) *Attorney, Agent, or Firm* — SQUIRE PATTON BOGGS (US) LLP

(57) ABSTRACT

Method, apparatuses, and computer program product for beam steering to support beam dithering in high aspect ratio antenna arrays are provided. One method may include applying a beam steering phase shift to a plurality of antenna array elements in an antenna array. The method may also include applying a non-uniform phase offset to each of the antenna array elements in addition to the beam steering phase shift. In addition, the method may include shifting a beam angle of the antenna array based on a combination of the beam steering phase shift and the non-uniform phase offset at each of the antenna array elements. The non-uniform phase offset may be a minimum phase increment.

12 Claims, 11 Drawing Sheets

(51) Int. Cl.
*H04B 1/02* (2006.01)
*H04B 7/02* (2018.01)
*H04B 7/06* (2006.01)

(56) References Cited

U.S. PATENT DOCUMENTS

| | | | | |
|---|---|---|---|---|
| 6,456,238 | B1* | 9/2002 | Posey | G01S 13/4463 |
| | | | | 342/149 |
| 7,026,989 | B1* | 4/2006 | Minkoff | H01Q 3/36 |
| | | | | 342/372 |
| 7,099,424 | B1* | 8/2006 | Chang | H03L 7/0814 |
| | | | | 327/284 |
| 8,643,543 | B2* | 2/2014 | Mckay | H01Q 3/2611 |
| | | | | 342/383 |
| 9,628,162 | B1* | 4/2017 | Chieh | H04B 1/0025 |
| 9,780,448 | B1* | 10/2017 | Meagher | H01P 1/184 |
| 9,831,933 | B1* | 11/2017 | Chieh | H03M 1/66 |
| 9,923,270 | B1* | 3/2018 | Little | H01Q 21/22 |
| 10,222,445 | B2* | 3/2019 | Cummings | G01S 3/74 |
| 10,389,023 | B2* | 8/2019 | Choi | H01Q 3/38 |
| 10,591,591 | B1* | 3/2020 | Prestwich | G01S 13/4481 |
| 2004/0087294 | A1* | 5/2004 | Wang | H04B 7/084 |
| | | | | 455/273 |
| 2005/0068249 | A1* | 3/2005 | Frederick du Toit | H01Q 3/242 |
| | | | | 343/757 |
| 2009/0097452 | A1* | 4/2009 | Gogic | H04B 7/269 |
| | | | | 370/336 |
| 2010/0091537 | A1* | 4/2010 | Best | G11C 5/025 |
| | | | | 365/220 |
| 2012/0062425 | A1* | 3/2012 | McKay | H01Q 3/2611 |
| | | | | 342/377 |
| 2012/0299706 | A1* | 11/2012 | Koo | H01Q 1/2225 |
| | | | | 235/492 |
| 2014/0071018 | A1* | 3/2014 | Pan | H01Q 21/24 |
| | | | | 343/867 |
| 2016/0093950 | A1* | 3/2016 | Cummings | H01Q 3/04 |
| | | | | 342/359 |
| 2016/0380754 | A1* | 12/2016 | Chen | H03B 5/1852 |
| | | | | 455/76 |
| 2017/0332249 | A1 | 11/2017 | Guey et al. | |
| 2018/0048364 | A1* | 2/2018 | Girnyk | H04B 7/0456 |
| 2018/0069309 | A1* | 3/2018 | Friedman | H04B 7/0408 |
| 2018/0331739 | A1* | 11/2018 | Nilsson | H04B 7/0408 |
| 2021/0313681 | A1* | 10/2021 | Ananth | H04B 7/18504 |
| 2022/0077594 | A1* | 3/2022 | Gamalski | H01Q 1/38 |
| 2022/0320727 | A1* | 10/2022 | Molla Aghajanzadeh | H01Q 3/2694 |

FOREIGN PATENT DOCUMENTS

| | | |
|---|---|---|
| CN | 205029667 U | 2/2016 |
| CN | 106464332 A | 2/2017 |
| CN | 107408970 A | 11/2017 |
| CN | 107769832 A | 3/2018 |
| CN | 108306667 A | 7/2018 |
| WO | 2018/192667 A1 | 10/2018 |
| WO | 2020/212730 A1 | 10/2020 |

OTHER PUBLICATIONS

International Search Report & Written Opinion dated Jul. 4, 2019 corresponding to International Patent Application No. PCT/US2018/060569.

Yang SI, "Analysis of Phased Sub-Array Scanning Performance", Spacecraft Engineering, vol. 16, No. 4, Jul. 15, 2007, 4 pages.

Chinese Office Action issued in corresponding Chinese Patent Application No. 201880100599.2 on Sep. 27, 2023.

* cited by examiner

BEAM STEERING RESOLUTIONS ENHANCEMENT

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to beam steering resolution enhancement techniques to support beam dithering in high aspect ratio arrays.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment may be directed to a method which may include applying a beam steering phase shift to a plurality of antenna array elements in an antenna array. The method may also include applying a non-uniform phase offset to each of the antenna array elements in addition to the beam steering phase shift. In addition, the method may include shifting a beam angle of the antenna array based on a combination of the beam steering phase shift and the non-uniform phase offset at each of the antenna array elements.

Another embodiment may be directed to an apparatus. The apparatus may include at least one processor, and at least one memory including computer program code. The at least one memory and computer program code may be configured, with the at least one processor, to cause the apparatus at least to apply a beam steering phase shift to a plurality of antenna array elements in an antenna array. The at least one memory and computer program code may also be configured, with the at least one processor, to cause the apparatus at least to apply a non-uniform phase offset to each of the antenna array elements in addition to the beam steering phase shift. The at least one memory and computer program code may further be configured, with the at least one processor, to cause the apparatus at least to shift a beam angle of the antenna array based on a combination of the beam steering phase shift and the non-uniform phase offset at each of the antenna array elements.

Another embodiment may be directed to an apparatus which may include circuitry configured to apply a beam steering phase shift to a plurality of antenna array elements in an antenna array. The apparatus may also include circuitry configured to apply a non-uniform phase offset to each of the antenna array elements in addition to the beam steering phase shift. In addition, the apparatus may include circuitry configured to shift a beam angle of the antenna array based on a combination of the beam steering phase shift and the non-uniform phase offset at each of the antenna array elements.

Another embodiment may be directed to an apparatus which may include means for applying a beam steering phase shift to a plurality of antenna array elements in an antenna array. The apparatus may also include means for applying a non-uniform phase offset to each of the antenna array elements in addition to the beam steering phase shift. In addition, the apparatus may include means for shifting a beam angle of the antenna array based on a combination of the beam steering phase shift and the non-uniform phase offset at each of the antenna array elements.

In an example embodiment, the method may also include repeatedly dithering a beam pointing direction of the antenna array by a fraction of a shift that is normally limited by a phase shifter step size. In another example embodiment, the non-uniform phase offset may be a minimum phase increment. According to a further example embodiment, the beam steering phase shift may be an accumulating steering phase shift between successive antenna array elements. According to an example embodiment, the non-uniform phase offset may be different for each antenna array element. In a further example embodiment, the non-uniform phase offset may be an integer multiple of a minimum phase shift. According to another example embodiment, the antenna array may be a linear antenna array.

Another embodiment may be directed to a non-transitory computer readable medium, which may include program instructions stored thereon for performing the functions of any one or more of the various example embodiments described above.

BRIEF DESCRIPTION OF THE DRAWINGS

For proper understanding of the invention, reference should be made to the accompanying drawings, wherein.

DETAILED DESCRIPTION

Figure 1:
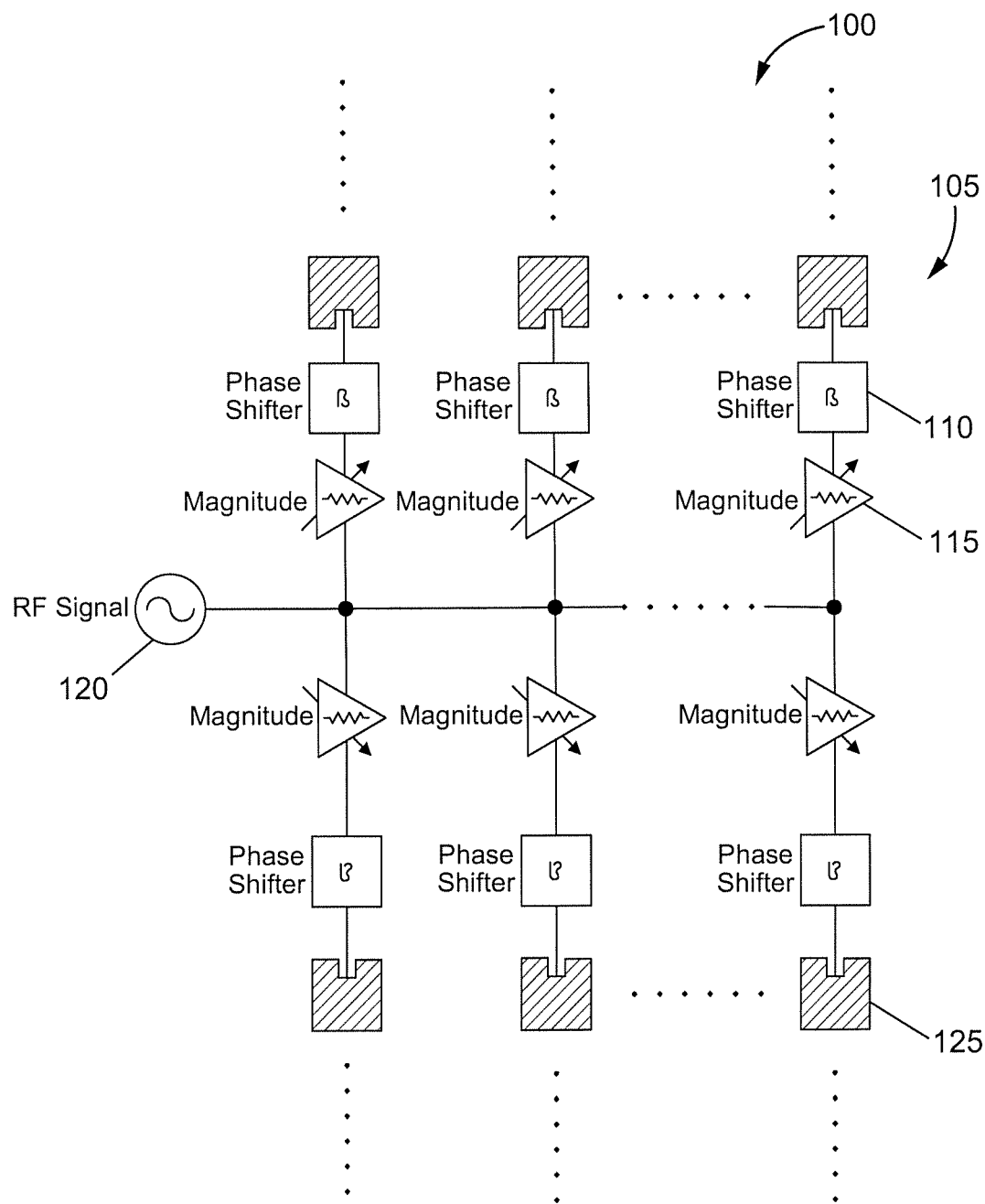
FIG. 1 illustrates a rectangular antenna array according to an example embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for beam steering, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

An antenna array may have various sizes. As one example, an antenna array size may be M=16. According to certain example embodiments, beam forming integrated circuits (ICs) may use a 5-bit phase shifter which leads to a minimum phase step of 11.25°. This minimum phase step·$\Delta\Psi$ determines the minimum increment in the steering angle $\Delta\varphi$ in the vicinity of boresite where S is the spacing of the elements and $\lambda$ is the operating wavelength:

$$\Delta\varphi \approx -\left(\frac{1}{2\pi}\right)\cdot\left(\frac{\lambda}{S}\right)\cdot\Delta\Psi$$

For the optimum elements spacing S=$\lambda$/2 the minimum steering angle increment becomes 3.6°, which is inadequate for certain applications.

However, there may be certain external and internal indications which favor tall and narrow arrays rather than square-shaped arrays. For instance, while maintaining the same gain as a 16×16 array (256 elements), it may be better to configure an 85×3 array (still 256 elements) because it may significantly improve the overall propagation link budget by up to approximately 8 dB.

An implication of the above-described antenna array, however, is that when M=85, the needed phase shift step may drop to 2.1°. This phase shift step is much smaller than the 11.25° capability of devices. There have been solutions involving use of either analogue (non-quantized) control or higher resolution phase shifters, or a combination of analogue control and higher resolution phase shifters. However, none seems to allow for more accurate steering control that was not generally (or practically) available. As such, new opportunities for array synthesis have become available.

To mitigate path loss at high frequencies, high gain antenna arrays may be used. However, one trait of antenna arrays is that the increase in power gain $G_p$ may result in narrower beam width. Conversely, a higher gain may result in narrower beams with the half power beam width (HPBW) being approximately proportional to $G_p^{-1/2}$. The beam width may narrow to the point where fine steering of the very narrow beam becomes a necessity.

Further, when a (bandwidth)×(users density) index is low such that interference is not a limiting factor, an intuitive approach of maximizing the desired signal may be adopted. For instance, simply maximizing the signal level by steering the beam in an appropriate direction may be one control strategy. Just off boresight, the beam gain may change slowly at first, roughly similar to a cos( ) function. However, the beam gain may then start to decrease, becoming very rapid at the null pattern. Since discrete steering angles may not, in general, match the direction of the target user, the average signal level may be lower than what is achievable. However, according to certain example embodiments, it may be possible to mitigate this handicap because the beam may be steered with much finer angular resolution than the limit dictated by the minimum phase step increment.

As a comparative example, a 16-element linear array may be provided. The 16-element linear array may use a phase shifter capable of 11.25° phase increments. Such an array may result in steering angle steps in the order of 3.5°. However, considering that the array HPBW is also the same order, the signal power may diminish to about 50% at this beam angle. However, by employing the techniques described herein, the beam may be controlled to within about 0.6°, resulting in a lowest power level of 97% as compared to being down by as much as 50%.

There may also be deployments where the (bandwidth)× (users density) index is high (typified by urban environments and point of interfaces (POIs)), where interference between cell sites becomes limiting over signal strength, especially in 5G deployments. In these cases, it may be necessary to maximize the signal to interference and noise ratio (SINR). While SINR may improve by steering the beam towards the desired station, the optimum SINR will likely occur when the pattern null is steered towards the interfering station. This strategy may exploit the fact that antenna array nulls are deep, but they are also sharp and therefore require fine steering capability. If achieved, it may be possible to direct a null towards an interferer and suppress it by tens of dB yet only impact the signal by tenths of dB and, thus, improving the overall signal to interference ratio by tens of dB. This method, which may be referred to as zero-forcing, may provide a large gain and significantly improve coverage and throughput.

Beam steering in an array, such as an antenna array, may generally be achieved by applying a successive phase advance to each element of the array. Alternatively, in the case of array synthesis, a computed phase and amplitude may be applied for each patch in the array. In modern communications equipment, these computations may be done digitally and the signal amplitude and phase control may be digital. More specifically, the control signals may become quantized resulting in some minimum phase and amplitude increment. Thus, regardless of how the beam is formed, it may be that the direction required cannot be achieved because of quantization. That is, one value may be too small and the next available value may be too large.

Certain example embodiments may provide a solution to at least this problem by providing a small beam steering displacement, one which is less than what the minimum amplitude and/or phase steps would normally allow. As such, certain example embodiments may provide a direction bias.

An associated antenna array challenge concerns control of a sidelobe level for minimizing or at least bounding the interference level. Synthesis of such arrays may involve determination of the amplitude that each element in the array is driven with. This may become more exacting as the level of suppression is increased. Such a procedure may be referred to as "tapering," and as with phase steering, the amplitudes may also be quantized which may result in less than expected performance. However, according to certain example embodiments, a basic technique may be applied to calculate the element amplitude weights, but restricted to the subset of elements that are incrementally related to each other.

According to certain example embodiments, an array steering procedure may be provided for an array, such as an antenna array. The array steering procedure may include an accumulating steering phase $k \cdot \alpha$, which may be applied to each element of the array, where "k" refers to the $k^{th}$ element in the array. This successive phase may result in beam steering of the antenna array. In general, phase shifters (and magnitude scalers) may be digitally controlled and, as such, the smallest value of $\alpha$ that can be applied is quantized. For example, a shifter capable of 360° but controlled with a 5-bit word, may have a step size of 11.25°. If this component was used in a 16-element array (half-wavelength element spacing), the minimum beam steering angle may be in the order of 3.5°. However, if this beam was 3.5° in error from the desired target the signal level may be down by about 50%. Thus, it may be desirable to be able to steer the beam on a finer basis.

In certain example embodiments, it may be possible to apply a small non-uniform phase offset to each element in the array, and accomplish a small shift of the beam angle. To accommodate the discrete nature of the phase shifter, the offset used may be an integer multiple of the minimum phase shift, and the beam steering achieved may be equivalent to the average slope of the phase steps. In an example embodiment, this slope may be less than that imposed by the minimum a. Furthermore, the small beam shift may shift the array null and may not have any significant degradation to sidelobes, both on axis and when steered substantially off axis.

In an example embodiment, arrays may be made up of an arrangement of individual elements driven from a common source with specific amplitudes and phases. While the geometry of the array may be arbitrary, regular geometric structures may lend themselves to closed form solutions, which may be convenient for synthesis. In addition, while certain example embodiments described herein refer to rectangular and linear arrays, other example embodiments may include, for example, a circular array or any other shape array.

FIG. 1 illustrates a rectangular antenna array 100 according to an example embodiment. The rectangular antenna array 100 may include one or more elements that are placed on a Cartesian plane with the elements spaced on a regular basis. For example, the rectangular antenna array 100 may include one or more array elements 105. As illustrated in FIG. 1, each array element 105 may include a phase shifter 110, a magnitude scaler 115, and a radiating element 125. The radiating element 125 may be a patch as depicted but can be any structure that radiates an electromagnetic signal such as but not limited to, a bow-tie, slot, waveguide or another array of elements. Elements 110 and 115 allow adjustment of the magnitude and phase of the electromagnetic field radiated by each element 105. In so doing, this shapes the radiation pattern of the net field which may be a vector summation of the contributions from each element at some point in space far removed from the structure 100. In addition, the rectangular array 100 may include a radio frequency (RF) source 120 that is common and drives each of the elements 105 in the rectangular antenna array. In certain example embodiments, each of the elements may have a specifically contrived and unique setting of magnitude by way of 115 and phase by way of 110 to create the desired array pattern and beam steering.

According to certain example embodiments, deliberate selection of the magnitude and phase of the signal feeding each patch may cause a prescribed addition or cancellation of the far field radiated signal known as the antenna array pattern. To simplify the calculation, it may be necessary to first consider one row and calculate its array factor. Then, a column may be selected its array factor may be determined. The product of these two array factors may be that of a 2D array. However, in other example embodiments, this method may be applicable to other types of linear arrays.

Figure 2:
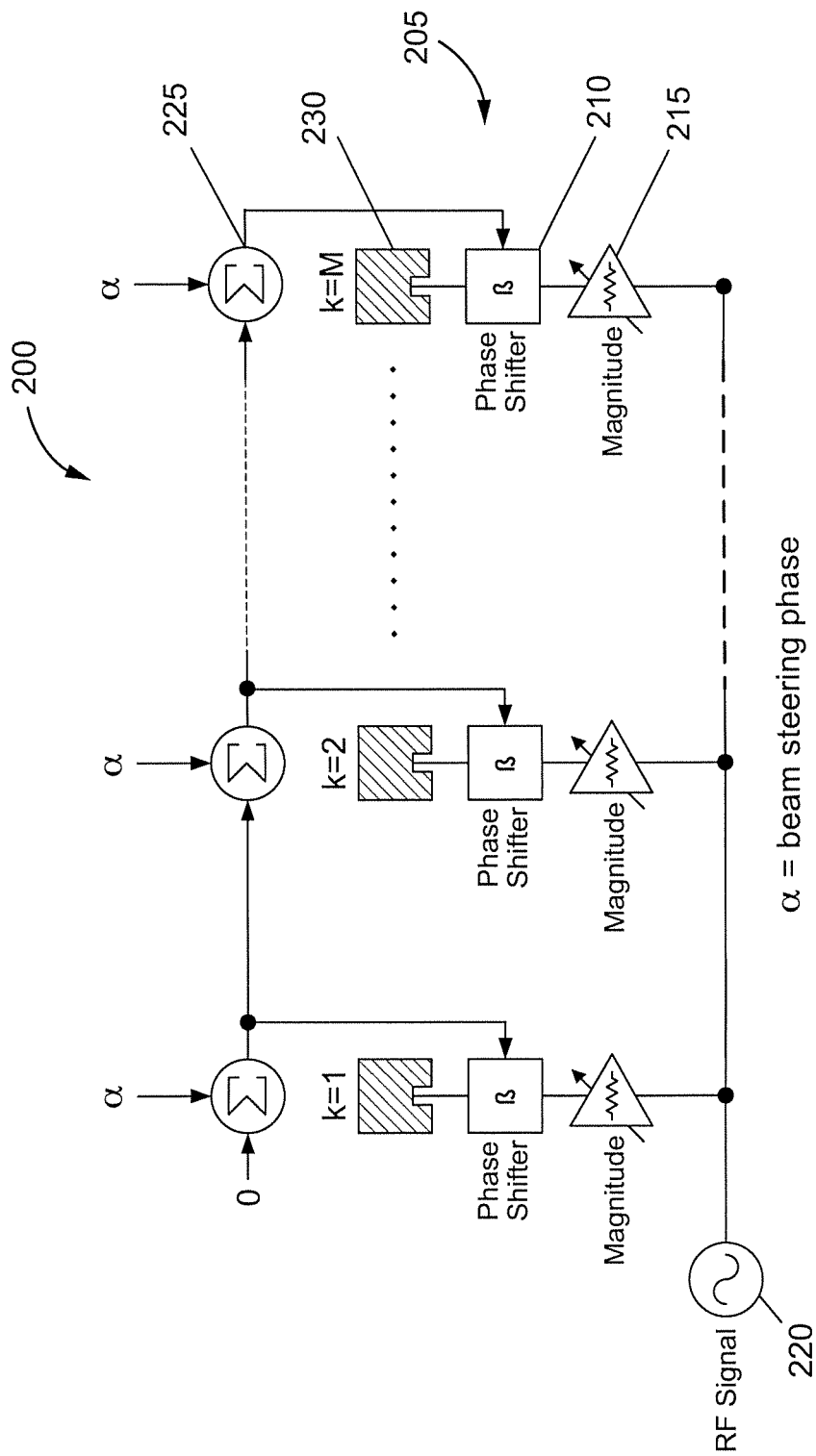
FIG. 2 illustrates a linear antenna array according to an example embodiment.

FIG. 2 illustrates a linear antenna array 200 according to an example embodiment. Similar to FIG. 1, the linear antenna array 200 illustrated in FIG. 2 may include one or more array elements 205. As illustrated in FIG. 2, each array element 205 may include a phase shifter 210, magnitude scaler 215, and a radiating element 230. The phase shifter 210, magnitude scaler 215 and radiating element 230 may have the same function as their corresponding elements in FIG. 1. The difference is the addition of the summers 225 which, in aggregate, may create an accumulating phase. Moreover, as illustrated in FIG. 2, a beam steering phase $\alpha$ is applied to each of the summers 225. As illustrated in FIG. 2, the result of this is a cascade of sums of the phase shift $\alpha$ from each 225 that is applied to each array element resulting in an accumulating phase shift of $\alpha$ between successive array elements. According to an example embodiment, this successive phase shift may result in the actual beam steering in the antenna array. In addition, each patch 205 may be driven by a common RF signal source 220.

As previously noted, the digital implementation of current generation phase shifters (and magnitude scalers) quantizes the smallest value of $\alpha$ that can be applied, and therefore the smallest shift in the beam direction. According to certain example embodiments, it may be possible therefore to apply a small non-uniform phase offset to each element in the array.

Figure 3:
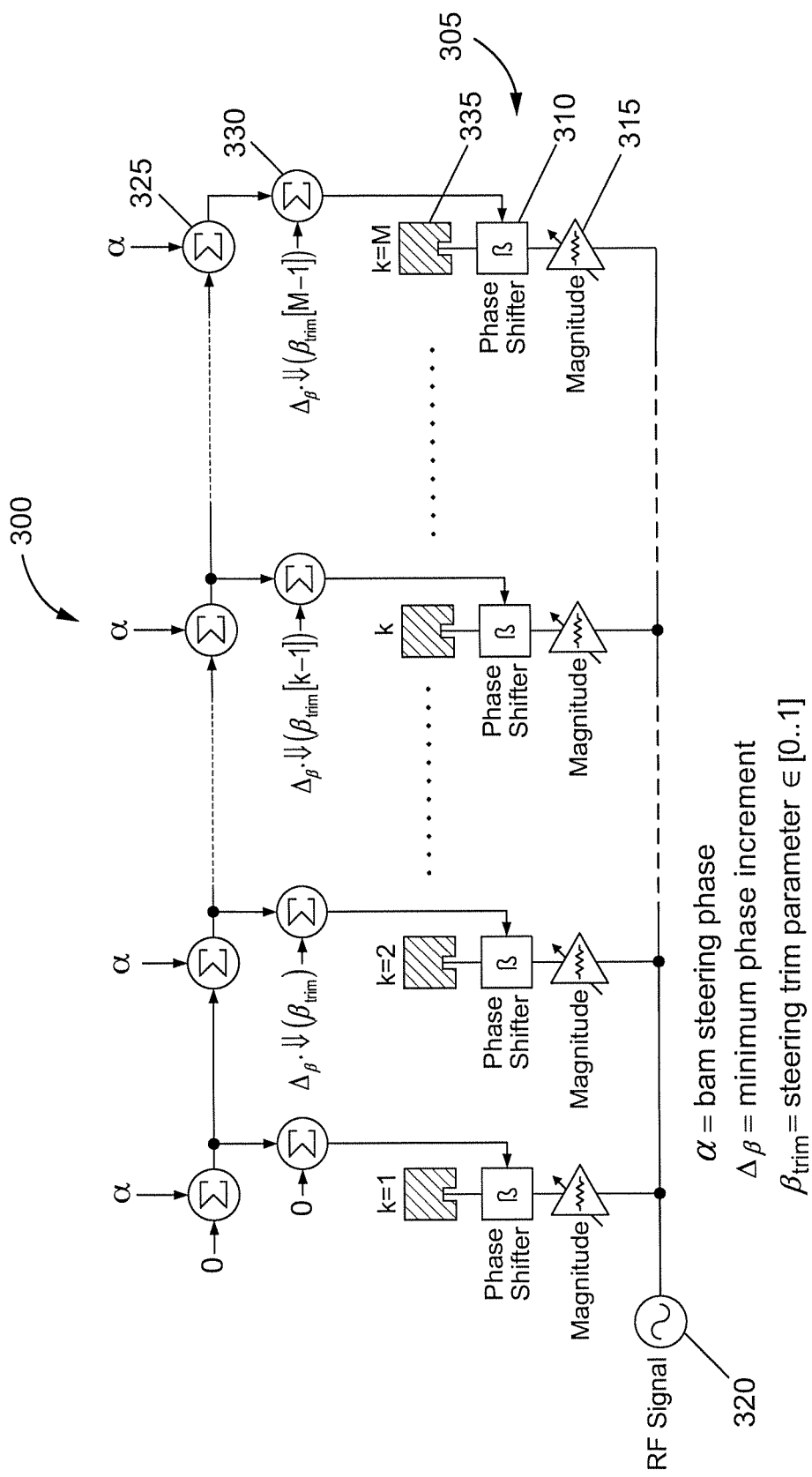
FIG. 3 illustrates a linear antenna array with beam trimming according to an example embodiment.

FIG. 3 illustrates a linear antenna array with beam trimming according to an example embodiment. In particular, FIG. 3 illustrates the beam steering functionality of FIG. 2 being applied to a linear antenna array 300. Similar to FIG. 2, the linear antenna array 300 illustrated in FIG. 3 may include one or more array elements 305 which is referenced by its index k. The first element in the array is k=1 and the last is k=M. Further, each array element 305 may include a corresponding phase shifter 310, magnitude scaler 315, and radiating element 335. The function of these are the same as their counterparts in FIG. 1 and FIG. 2. As illustrated in FIG. 3, each array element 305 may be driven by a common RF signal source 320. In addition, each array element 305 may have a corresponding beam steering phase α applied to the summers 325 applied thereto. Similar to that illustrated in FIG. 2, the cascade of sums of the phase shift α from each summer 325 may cause an accumulating phase shift of α between successive elements. This successive phase shift may therefore result in the actual beam steering in the antenna array.

As can be seen from FIGS. 2 and 3, a difference between these figures is that in FIG. 3, there is an additional non-uniform phase offset 330 added to each array element 305. In contrast to the beam steering phase a 325, the non-uniform phase offset 330 is not allowed to accumulate on a patch-by-patch basis. In an example embodiment, the added non-uniform phase offset 330 may be calculated according to equation (1) as follows:

$$\text{AddedPhase}_k = \Delta_\beta \cdot \Downarrow (\beta_{trim}[k-1]) \quad (1)$$

Figure 4:
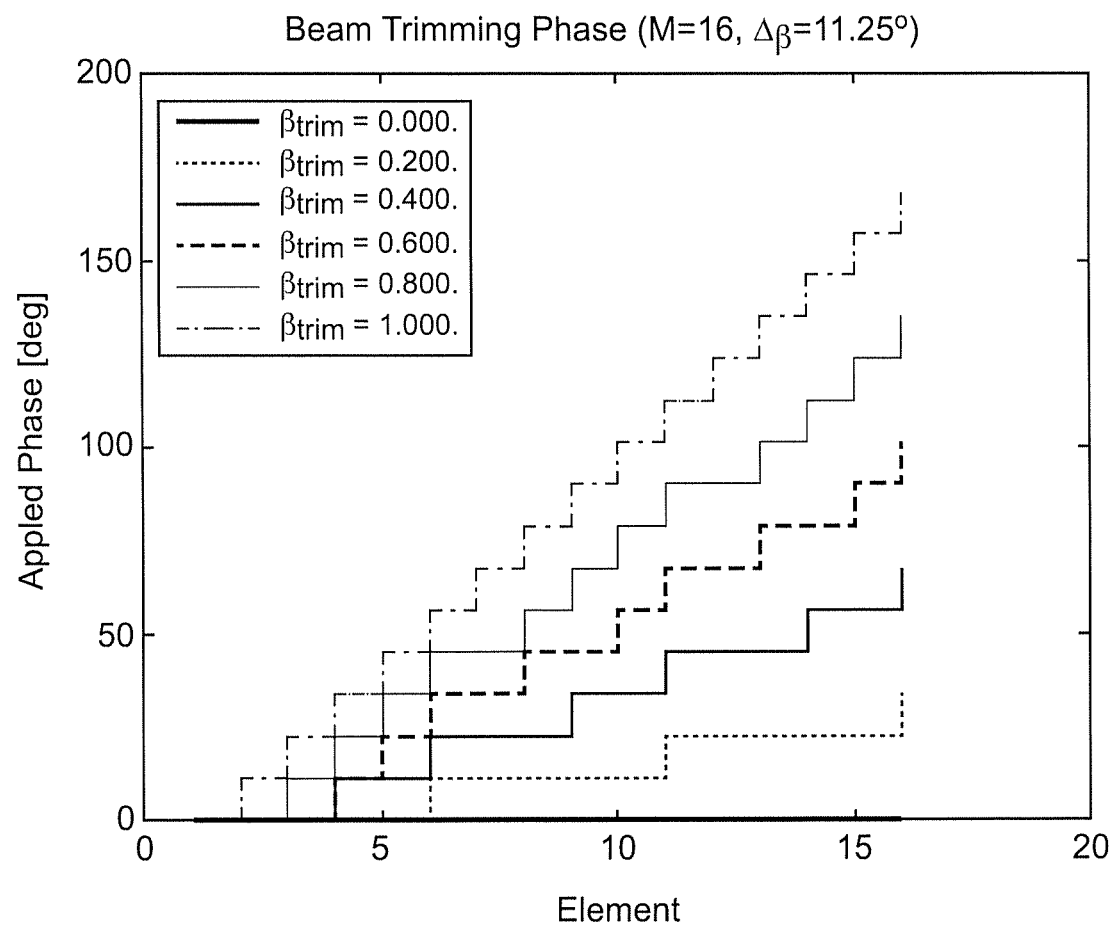
FIG. 4 illustrates a phase "bias" resulting from a beam trimming algorithm according to an example embodiment.

In equation (1), α represents a beam steering phase, $\Delta_\beta$ represents a minimum phase increment, $\beta_{trim}$ represents a steering trim parameter∈ [0 . . . 1], and ⇓ denotes the floor operation. This is one way, but not the only way, to generate a set of phase offsets that increment less slowly than by $\Delta_\beta$ for each element in the array. The parameter that controls the number of array elements that get the same phase offset is $\beta_{trim}$, and the effect it has on the phase offset is illustrated in FIG. 4. It can be thought of as fine tuning the steering angle between the otherwise discrete steering angles dictated by the phase shifter resolution where $\beta_{trim}=0$ is the beam dictated by α, and $\beta_{trim}=1$ is the next possible beam position.

From equation (1), it can be seen that the number of array elements between each phase step of $\Delta_\beta$ is $$\frac{1}{\beta_{trim}}.$$

Over the span of the array, the net effect of this is an average phase advance less than $\Delta_\beta$, meaning that the array steering resolution has been effectively reduced below the limit that would be set by $\Delta_\beta$ of the phase shifter. In fact, $$\Delta_{\beta_{effective}} = \frac{\Delta_\beta}{M}$$

which, in the case of the example 16-element array that had a minimum steering increment of 3.5°, it reduces to 0.22° effective.

FIG. 4 illustrates a phase "bias" resulting from a beam trimming algorithm according to an example embodiment and as described in the preceding paragraph. In particular, it is the additional phase "bias" that results from the operations corresponding to FIG. 3 is a staircase that, when averaged, has different slopes as a function of the $\beta_{trim}$ parameter. In an example embodiment, this operation may be implemented in the digital domain such as in application-specific integrated circuit (ASIC), field-programmable gate array (FPGA) or digital signal processing (DSP) since it represents manipulating the least significant bits (LSB's) of the phase shifter control, and does not require any complicated or floating point mathematics to be done.

Figure 5A:
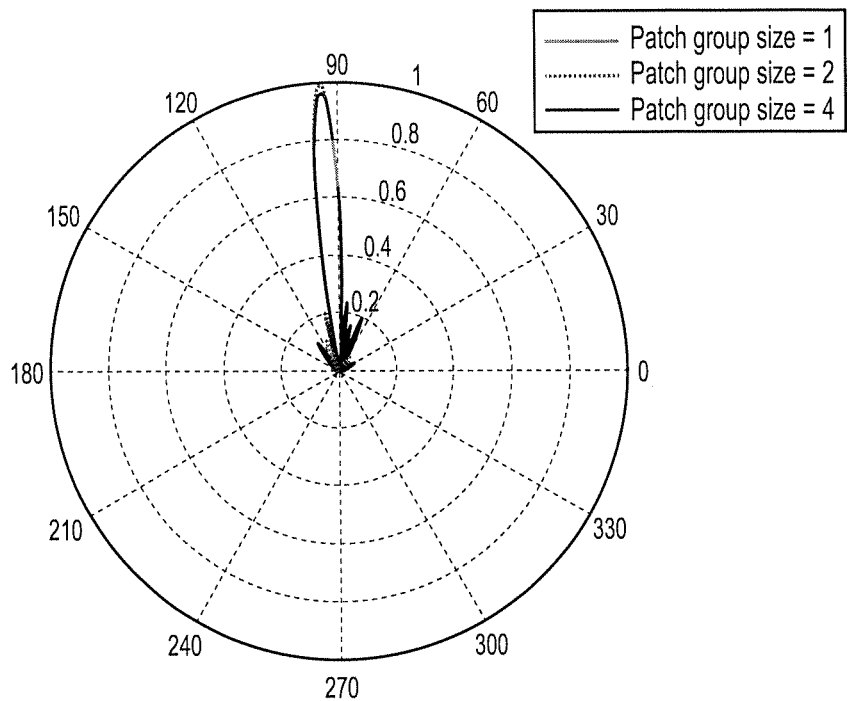
FIG. 5(A) illustrates a patch group steering according to an example embodiment.
Figure 5B:
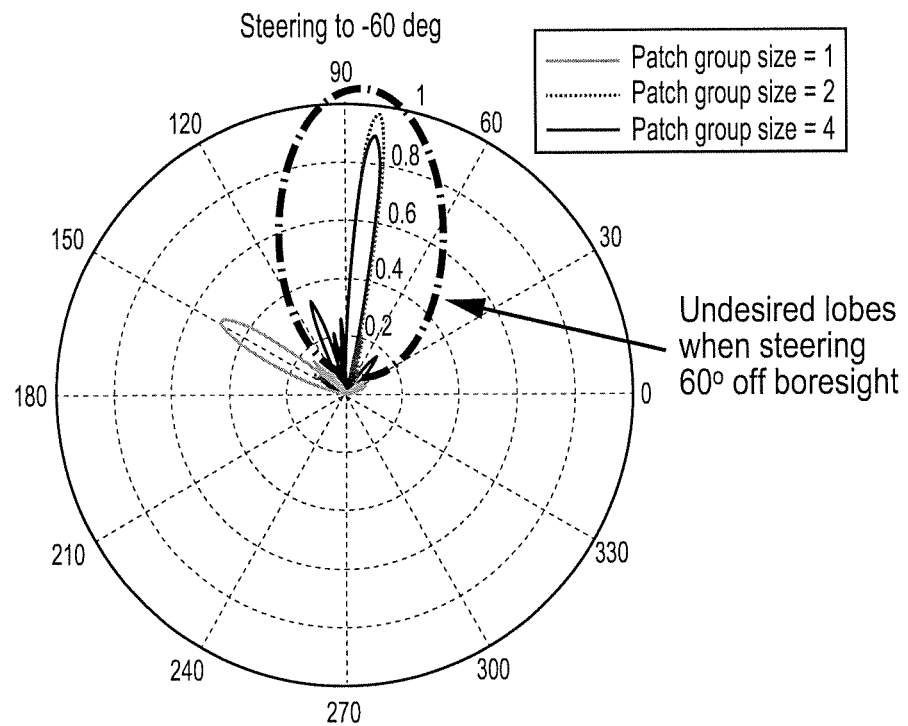
FIG. 5(B) illustrates another patch group steering according to an example embodiment.

One prior method that has been used involves treating the array as sub arrays and then steering the "groups" of sub-arrays. While this method works so long as the steering angle is small, the resolution is quite limited and for large steering angles large "grating" sidelobes are generated which limits the usefulness. This is illustrated in FIG. 5(A) with a small steering angle and then in FIG. 5(B) with a large steering angle and showing the large grating lobe that can result. Specifically, aside from the increased steering resolution and relative implementation simplicity in a digitally controlled system, with certain example embodiments, it may be possible to avoid any sidelobe generation at all.

Figure 6A:
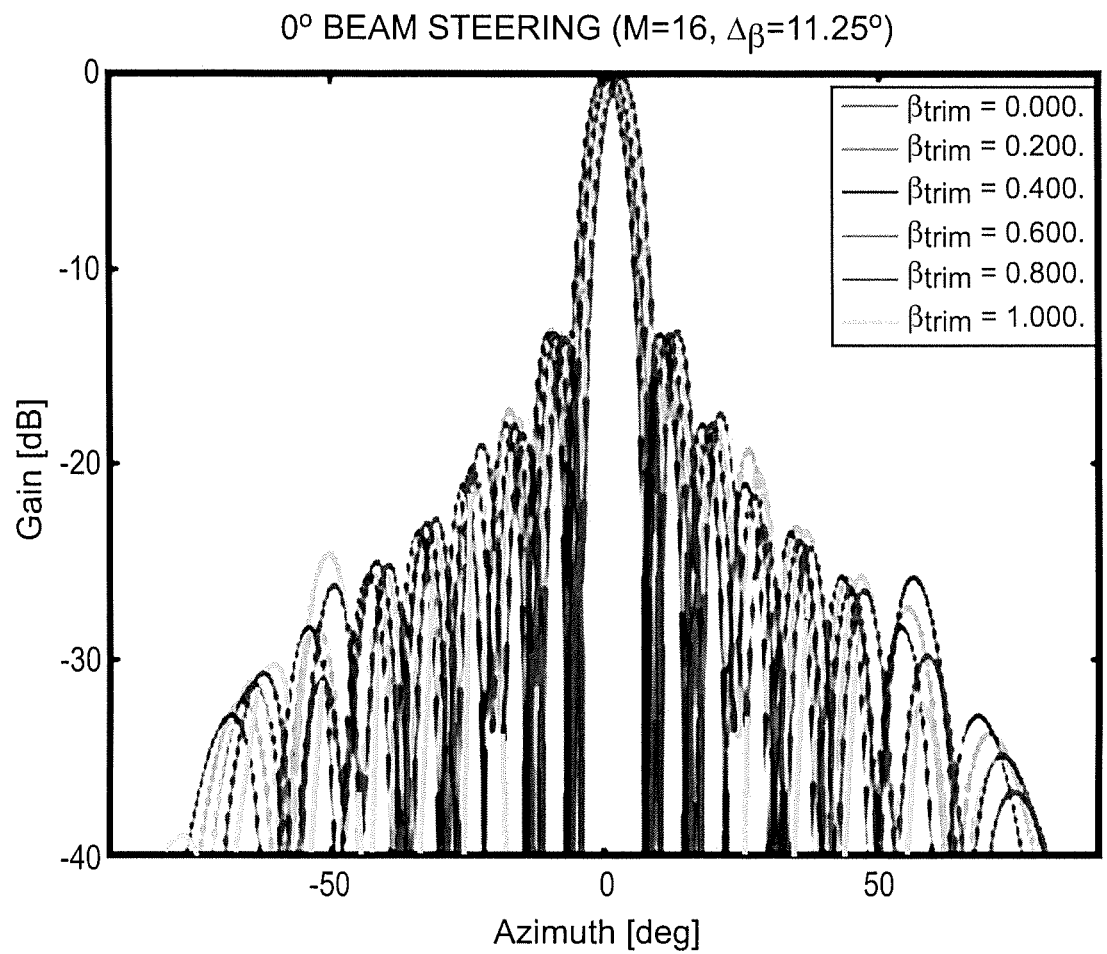
FIG. 6(A) illustrates effects of sidelobes as a result of beam steering at 0° according to an example embodiment.
Figure 6B:
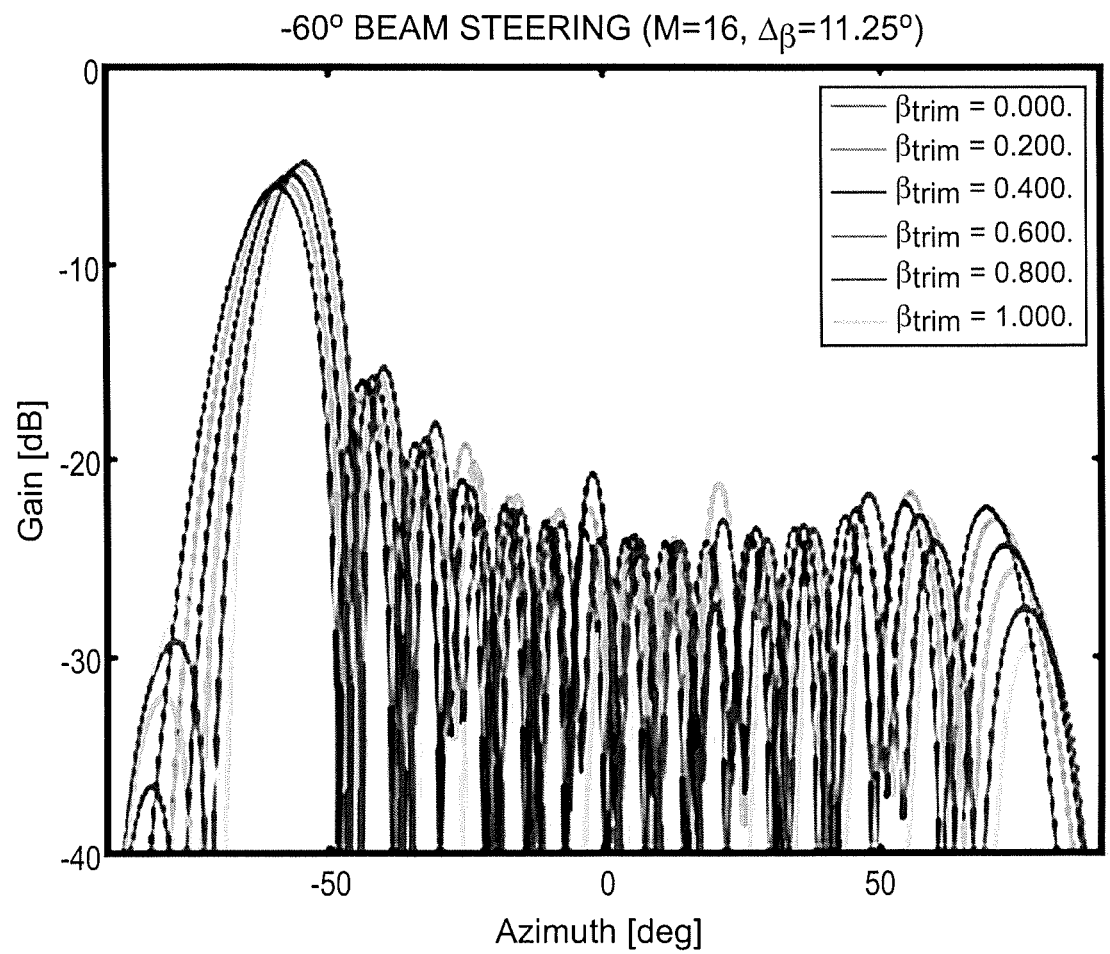
FIG. 6(B) illustrates effects of sidelobes as a result of beam steering at 60° according to an example embodiment.

Whereas FIG. 6 illustrates effects of sidelobes as a result of beam steering according to an example embodiment. As illustrated in FIG. 6, the method according to certain example embodiments has virtually no impact to the sidelobes. That is, certain example embodiments may inhibit the formation of undesired sidelobes that may limit the usefulness of the antenna array whilst obtaining fine control of the steering angle.

Figure 7:
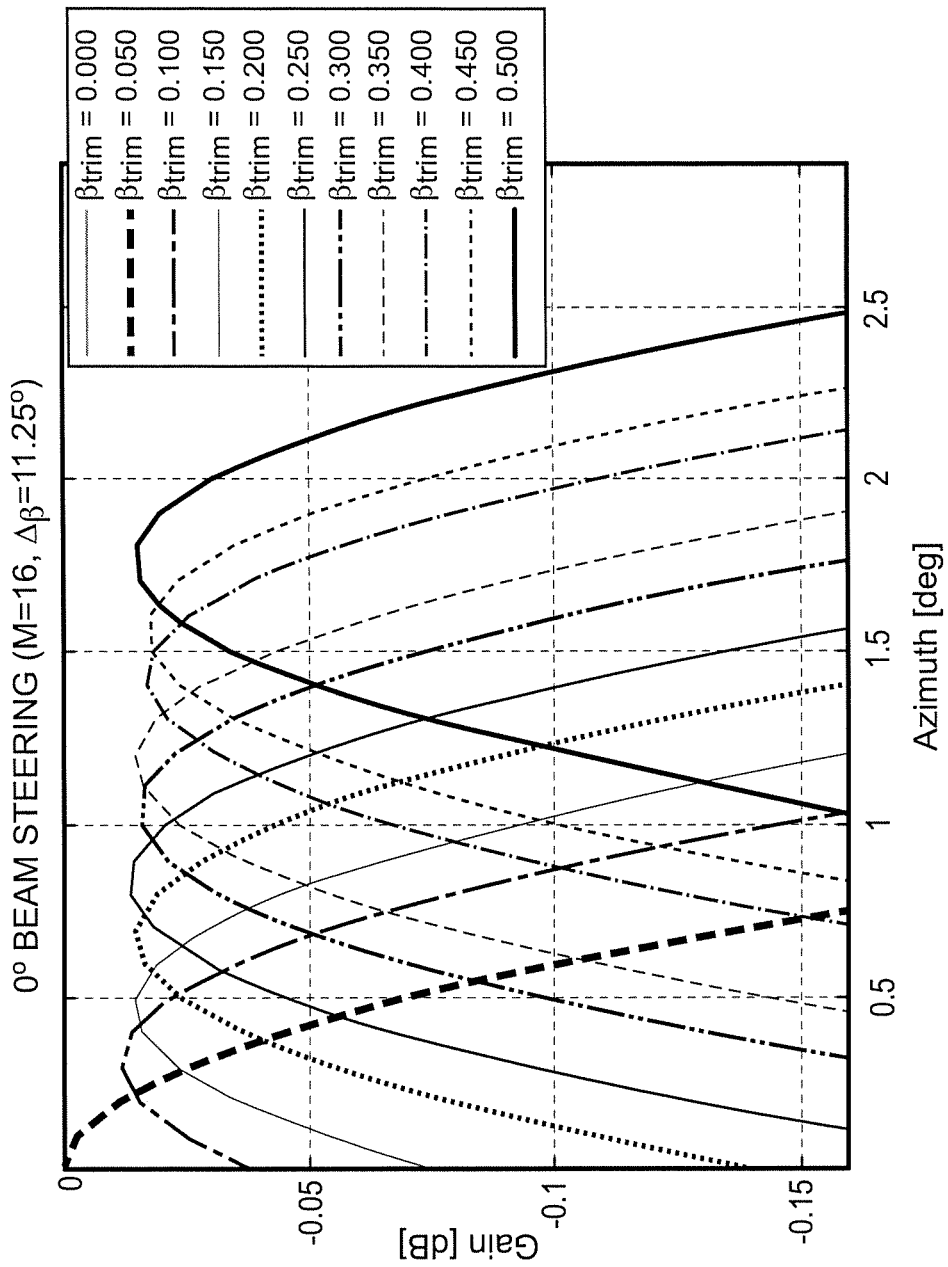
FIG. 7 illustrates results of beam trimming resolution of 0.3° versus 3.5° according to an example embodiment.

Further, FIG. 7 illustrates results of beam trimming resolution of 0.3° versus 3.5° according to an example embodiment. That is, as illustrated in FIG. 7, certain example embodiments may allow for very fine or granular directional control of the main beam.

Figure 8:
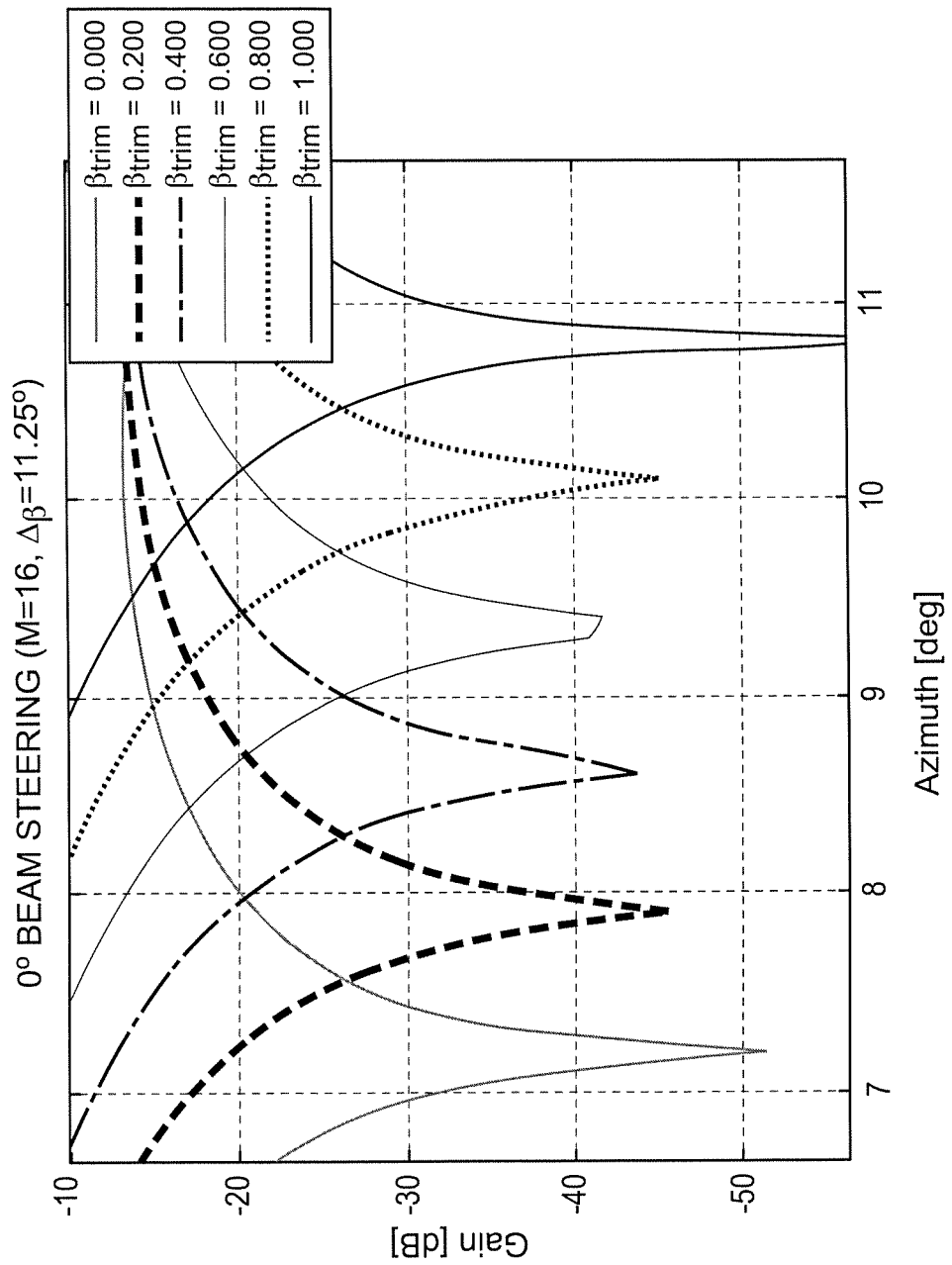
FIG. 8 illustrates that null patterns follow a shift in the main lobe according to an example embodiment.

FIG. 8 illustrates that null patterns follow a shift in the main lobe according to an example embodiment. Specifically, FIG. 8 illustrates null patterns that follow a shift in the main lobe that is nominally at 0° beam steering, meaning α=0, but with the $\beta_{trim}$ parameter employed to finely adjust the beam direction. According to an example embodiment, the angular position of the null may also move with the beam trim. Further, the angular position of the null may be significant to interference suppression techniques such as zero-forcing arrays. In an example embodiment, trimming in a single axis may be shown for clarity. However, in other example embodiments, the method may be extendable to additional dimensions due to the properties of array factor multiplication.

Figure 9:
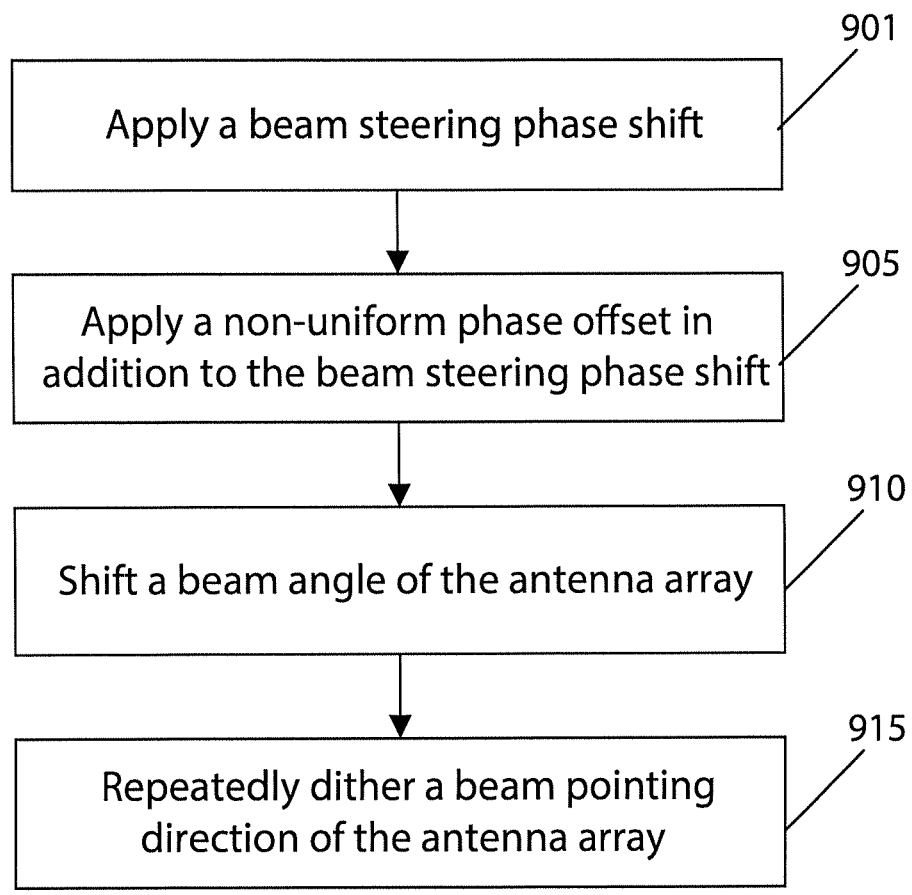
FIG. 9 illustrates an example flow diagram of a method according to an example embodiment.

FIG. 9 illustrates an example flow diagram of a method according to an example embodiment. In certain example embodiments, the flow diagram of FIG. 9 may be performed by a network node, such as a base station, node B, eNB, gNB, or any other access node, or one or more servers in a cloud configuration. For example, at 901, the method may include applying a beam steering phase shift to a plurality of antenna array elements in an antenna array. The method may also include, at 905, applying a non-uniform phase offset to each of the antenna array elements in addition to the beam steering phase shift. In addition, the method may include, at 910, shifting a beam angle of the antenna array based on a combination of the beam steering phase shift and the non-uniform phase offset at each of the antenna array elements. In addition, the method may include, at 915, repeatedly dithering a beam pointing direction of the antenna array by a fraction of a shift that is normally limited by a phase shifter step size.

By the same token, in certain example embodiments, shifting or dithering the beam by some small amount may also be done autonomously by the array control logic to effect, for example, null filling by repeatedly "dithering" the beam pointing direction by a small amount. This is one approach to mitigate null blindness. The small amount, in certain example embodiments, may be a fraction of the shift that is normally limited by the phase shifter step size. For instance, this may be a situation where the $\beta_{trim}$ parameter falls between 0 and 1.

In an example embodiment, the non-uniform phase offset may be set to a minimum phase increment. In another example embodiment, the beam steering phase shift may be an accumulating steering phase shift between successive antenna array elements. Further, in another example embodiment, the non-uniform phase offset may be defined by the equation: AddedPhase$_k$=Δ$_β$·⇓ (β$_{trim}$[k−1]).

According to another example embodiment, the non-uniform phase offset is different for each antenna array element. Moreover, in an example embodiment, the non-uniform phase offset is an integer multiple of a minimum phase shift Δ$_β$ and is applied in conjunction with α. In addition, according to an example embodiment, the antenna array may be a linear antenna array.

Figure 10A:
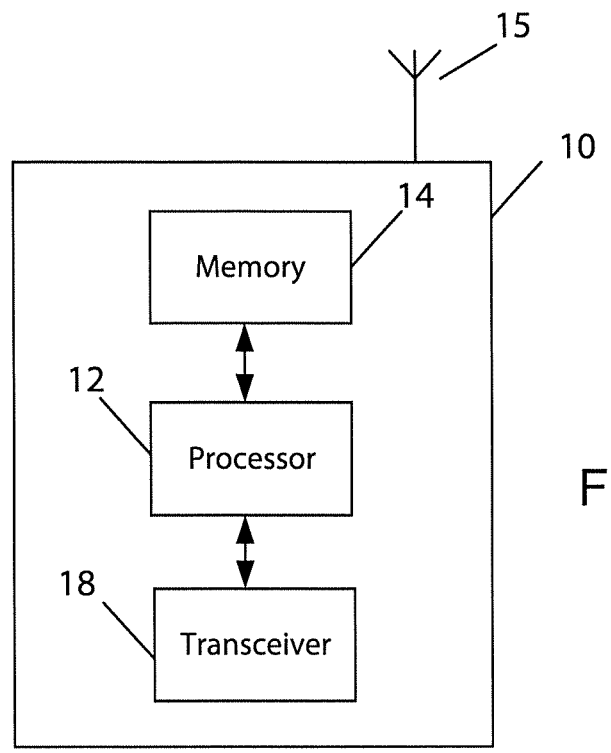
FIG. 10(A) illustrates a block diagram of an apparatus according to an example embodiment

FIG. 10(A) illustrates an example of an apparatus 10 according to an example embodiment. In an example embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 10(A).

As illustrated in the example of FIG. 10(A), apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10(A), multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions (such as those described herein), and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as those illustrated in FIGS. 1-9. In some example embodiments, for instance, apparatus 10 may be configured to perform a process for beam steering in an antenna array made up of a plurality of antenna array elements.

For example, in some example embodiments, apparatus 10 may be controlled by memory 14 and processor 12 to apply a beam steering phase shift to a plurality of antenna array elements in an antenna array. Apparatus 10 may also be controlled by memory 14 and processor 12 to apply a non-uniform phase offset to each of the antenna array elements in addition to the beam steering phase shift. Apparatus 10 may further be controlled by memory 14 and processor 12 to shift a beam angle of the antenna array based on a combination of the beam steering phase shift and the non-uniform phase offset at each of the antenna array elements. In addition, the apparatus 10 may be controlled by memory 14 and processor 12 to repeatedly dither a beam pointing direction of the antenna array by a fraction of a shift that is normally limited by a phase shifter step size.

Figure 10B:
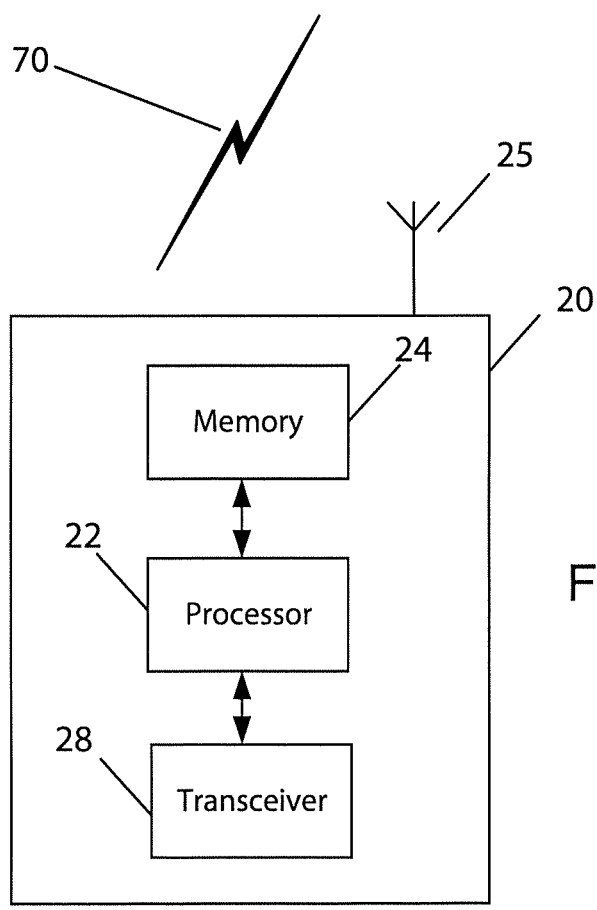
FIG. 10(B) illustrates a block diagram of another apparatus according to an example embodiment.

FIG. 10(B) illustrates an example of an apparatus 20 according to another example embodiment. In an example embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 10(B).

As illustrated in the example of FIG. 10(B), apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10(B), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain example embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein.

The above embodiments may provide for significant improvements to beam steering accuracy needed by high aspect ratio antenna arrays or large arrays with very narrow beams, in addition to supporting beam dithering. For example, the above example embodiments may be applied to calculation of the element amplitude weights in an antenna array, and be restricted to the subset of elements that are incrementally related to each other. Other example embodiments may provide the ability to steer an array, such as an antenna array, with finer resolutions than the phase shifts allow to support beam dithering in arrays that have a high aspect ratio.

Additional example embodiments may be able to mitigate problems with matching the direction of the target user by steering the beam with much finer angular resolution than the limit dictated by the minimum phase step increment. Moreover, it may be possible to improve coverage and throughput, and control the beam to achieve a lowest power level as compared to conventional techniques. Further, certain example embodiments may allow for effective steering resolution to be much smaller than that of the phase shifter step size, and allow for more accurate steering control that have not been available in conventional techniques. In addition, according to certain example embodiments, it may be possible to provide a steering resolution that can be controlled so that there is no impact to sidelobes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would

| Partial Glossary | |
| --- | --- |
| dB | Decibels |
| $G_p$ | Power Gain |
| eNB | Enhanced Node B (LTE base station) |
| gNB | 5G or NR Base Station |
| HPBW | Half Power Beam Width |
| LSB's | Least Significant Bits |
| LTE | Long Term Evolution |
| MIMO | Multiple Input Multiple Output |
| NR | New Radio |
| NR-U | New Radio Unlicensed |
| RF | Radio Frequency |
| UE | User Equipment |

I claim:

1. A method, comprising:

applying a beam steering phase shift to a plurality of antenna array elements in an antenna array;

applying a non-uniform phase offset to each of the antenna array elements in addition to the beam steering phase shift;

shifting a beam angle of the antenna array based on a combination of the beam steering phase shift and the non-uniform phase offset at each of the antenna array elements; and repeatedly dithering a beam pointing direction of the antenna array by an amount lower than a shift that is normally limited by a phase shifter step size, wherein the non-uniform phase offset is a minimum phase increment, and wherein the non-uniform phase offset is an integer multiple of a minimum phase shift.

2. The method according to claim 1, wherein the beam steering phase shift is an accumulating steering phase shift between successive antenna array elements.

3. The method according to claim 1, wherein the non-uniform phase offset is different for each antenna array element.

4. The method according to claim 1, wherein the antenna array is one of a linear antenna array, a rectangular antenna array, or a circular antenna array.

5. The method according to claim 1, wherein each of the antenna array elements comprises a magnitude scaler, a phase shifter, and a radiating element, and wherein the antenna array comprises a radio frequency source that is common and drives each of the antenna array elements.

6. A non-transitory computer readable medium comprising program instructions stored thereon, wherein when executed on a processor, the program instructions cause the processor to perform the method according to claim 1.

7. An apparatus, comprising:

at least one processor; and at least one memory comprising computer program code, the at least one memory and computer program code configured, with the at least one processor to cause the apparatus at least to apply a beam steering phase shift to a plurality of antenna array elements in an antenna array;

apply a non-uniform phase offset to each of the antenna array elements in addition to the beam steering phase shift;

shift a beam angle of the antenna array based on a combination of the beam steering phase shift and the non-uniform phase offset at each of the antenna array elements;

repeatedly dither a beam pointing direction of the antenna array by an amount lower than a shift that is normally limited by a phase shifter step size, wherein the non-uniform phase offset is a minimum phase increment, and wherein the non-uniform phase offset is an integer multiple of a minimum phase shift.

8. The apparatus according to claim 7, wherein the beam steering phase shift is an accumulating steering phase shift between successive antenna array elements.

9. The apparatus according to claim 7, wherein the non-uniform phase offset is different for each antenna array element.

10. The apparatus according to claim 7, wherein the antenna array is one of a linear antenna array, a rectangular antenna array, or a circular antenna array.

11. The apparatus according to claim 7, wherein each of the antenna array elements comprises a magnitude scaler, a phase shifter, and a radiating element, and wherein the antenna array comprises a radio frequency source that is common and drives each of the antenna array elements.

12. An apparatus, comprising:

circuitry configured to apply a beam steering phase shift to a plurality of antenna array elements in an antenna array;

circuitry configured to apply a non-uniform phase offset to each of the antenna array elements in addition to the beam steering phase shift;

circuitry configured to shift a beam angle of the antenna array based on a combination of the beam steering phase shift and the non-uniform phase offset at each of the antenna array elements;

circuitry configured to repeatedly dither a beam pointing direction of the antenna array by an amount lower than a shift that is normally limited by a phase shifter step size, wherein the non-uniform phase offset is a minimum phase increment, and wherein the non-uniform phase offset is an integer multiple of a minimum phase shift.

* * * * *